US006753282B2

(12) United States Patent
Fleischmann et al.

(10) Patent No.: US 6,753,282 B2
(45) Date of Patent: Jun. 22, 2004

(54) METHOD FOR PRODUCING MONOLITHIC, POROUS, CERAMIC SHAPED BODIES

(75) Inventors: Thomas Fleischmann, Quirla (DE); Heike Kastner, Weissenborn (DE)

(73) Assignee: TAMI Deutschland GmbH, Hermsdorf/Thuer. (DE)

( * ) Notice: Subject to any disclaimer, the term of this patent is extended or adjusted under 35 U.S.C. 154(b) by 8 days.

(21) Appl. No.: 10/221,071

(22) PCT Filed: Mar. 7, 2001

(86) PCT No.: PCT/EP01/02541

§ 371 (c)(1), (2), (4) Date: Sep. 9, 2002

(87) PCT Pub. No.: WO01/68558

PCT Pub. Date: Sep. 20, 2001

(65) Prior Publication Data

US 2003/0039774 A1 Feb. 27, 2003

(30) Foreign Application Priority Data

Mar. 14, 2000 (DE) ........................................ 100 13 366

(51) Int. Cl.[7] .......................... C04B 38/00; C04B 35/46

(52) U.S. Cl. ........................... 501/80; 501/134; 264/43; 264/117; 264/125; 264/628

(58) Field of Search ..................... 501/80, 134; 264/43, 264/117, 125, 628

(56) References Cited

U.S. PATENT DOCUMENTS 5,069,697 A * 12/1991 Hamaguchi et al. .......... 55/523
5,183,608 A * 2/1993 Guile .......................... 264/44
5,185,110 A * 2/1993 Hamaguchi et al. .......... 264/44
5,223,318 A 6/1993 Faber et al. ................ 428/116
5,415,775 A * 5/1995 Castillon et al. ............ 210/490

FOREIGN PATENT DOCUMENTS

EP 0354721 2/1990
EP 0450899 10/1991
EP 0549873 7/1993
EP 0585152 3/1994

* cited by examiner

*Primary Examiner*—Karl Group
(74) *Attorney, Agent, or Firm*—Jordan and Hamburg LLP

(57) ABSTRACT

The invention relates to a method for producing a monolithic, porous, ceramic shaped body and to the shaped bodies produced according to this method. Said shaped body is used predominantly as a support material for porous, inorganic and/or organic membranes for the flow filtration of liquids and gases. The aim of the invention is to provide a method for producing a shaped body consisting substantially of $TiO_2$ with an open porosity >10%, an average pore size of between 1 and 50 μm and a mechanical stability >20 $N/mm^2$. To achieve this, a first $TiO_2$-powder fraction is pre-sintered at temperatures >1200° C. and subsequently ground to achieve a screening refuse of at least <5% for grain sizes of less than 100 μm, at least an additional $TiO_2$ powder fraction, whose grain size is significantly smaller than that of the first powder fraction, is added to and mixed with the granulate and the mixture obtained is compressed into a shaped body which is subjected to an additional sintering process at temperatures that are >1100° C. but lower than the first sintering temperature.

4 Claims, No Drawings

METHOD FOR PRODUCING MONOLITHIC, POROUS, CERAMIC SHAPED BODIES

BACKGROUND OF THE INVENTION

The invention relates to a method for producing a monolithic, porous, ceramic shaped body which is predominantly used as a supporting material for porous, inorganic and/or organic membranes for the flow filtration (cross flow) of liquids and gases.

According to the prior art, porous oxide ceramic filter materials are produced by ceramic mixing and shaping methods and subsequent sintering. To obtain a porosity of >30% and pore sizes of 1–20 $\mu$m two basic methods are common use:

a) A coarse ceramic powder granulation of a mean grain size between 3–500 $\mu$m is mixed with a fine ceramic powder granulation of a mean grain size between 0.01–7 $\mu$m, whereby the fine-grained powder material envelopes the coarse-grained particles. The fine-grained material, due to its low melting point, acts as a flux during the sintering process. Such methods are described in, for example, EP 0 450 899, EP 0 585 152 or in the U.S. Pat. No. 5,223,318.

b) A fine ceramic powder granulation of a mean grain size between 0.01–7 $\mu$m is mixed, shaped and sintered with organic material, whereby the organic material is burnt out during sintering and leaves open pores in the shaped body. Such methods are described in, for example, EP 0 354 721, and EP 0 549 873.

The use of the method to b) is problematic for environmental reasons and, moreover, this method does not ensure the required purity of the material for the porous filters. The prior art methods do not permit a manufacture of a ceramic filter material under use of $TiO_2$-powder of sufficiently large grain sizes, whereby the filter material shall consist of nearly 100% $TiO_2$ and shall have an open porosity of >20%. When $TiO_2$-powder of a mean grain size of between 0.1–1 $\mu$m is tempered, a sintering at a temperature of >1100° C. starts which is accompanied by a structural densification and an increase of strength. Hence, it is not possible to achieve a sufficiently open porosity in this manner in ranges of temperature >1200° C.

SUMMARY OF THE INVENTION

It is an object of the present invention to provide a method for producing monolithic, porous, ceramic shaped body which is adapted for use as support for inorganic and/or organic membranes for the separation of solids, liquids and gases by way of flow filtration, whereby the material for these shaped bodies has to be $TiO_2$>99.9% and commercially available $TiO_2$-powder can be utilized, and the shaped body shall have the following properties:

open porosity: >10% mean pore size: 1–50 $\mu$m, preferably 3–5 $\mu$m, mechanical strength: >20N/mm$^2$, preferably >30N/mm$^2$.

The object is realized by the features of the first claim. The strong structural compaction of the material in the course of sintering in the range of temperature >1200° C. as typical for the prior art is eliminated in that a considerable part of the initial $TiO_2$-powder is pre-sintered at temperatures >1200° C., whereby the powder particles are sintered to agglomerates. In a subsequent process this pre-compacted material is reduced in size such that mean grain sizes of <100 $\mu$m will result. The thermally pre-compacted powder obtained in this manner is mixed with a further smaller part of the thermally not pretreated initial $TiO_2$-powder, shaped and sintered at temperatures which lie below the pre-sintering temperatures. Thus, a sintering of the thermally not pretreated powder with the thermally pretreated powder is obtained, whereby the here occurring structural compaction is only the result of the sintering of the smaller part of the thermally not pretreated initial $TiO_2$-powder. As a result of this proceeding, a monolithic porous ceramic shaped body is obtained exhibiting the properties which are to be obtained according to the task set by the present invention.

DETAILED DESCRIPTION OF THE INVENTION

The invention will be explained hereinafter in more detail by virtue of three embodiments:

In a first embodiment 70 weight % of a commercially available initial $TiO_2$-powder having a mean grain size of 0.9 $\mu$m will be sintered at 1320° C. and subsequently wet-milled in a drum mill to a screening refuse of <1% at 100 $\mu$m. After drying the pre-sintered powder, the latter is mixed in a mixing kneading mill with 30 weight % of $TiO_2$-powder of a mean grain size of 0.3 $\mu$m which is added as a suspension, and then is plasticized by addition of cellulose. Out of this mass any desired base bodies, for example, extruded tubes can be formed which are sintered at about 1300° C. Thereafter, these shaped bodies exhibit an open porosity of 25%, a bursting strength of 80 bar and a mean pore size of 3.0 $\mu$m.

In a second embodiment 60 weight % of a commercially available initial $TiO_2$-powder having a mean grain size of 1.4 $\mu$m will be sintered at 1350° C. and subsequently, in analogy to the first embodiment, milled to a screening refuse of <1% at 100 $\mu$m. A powder, pre-sintered in this manner, will subsequently be mixed in a mixing granulator with 20 weight % of $TiO_2$-powder of a mean grain size of 0.3 $\mu$m and 20 weight % of $TiO_2$-powder of a mean grain size of 0.5 $\mu$m and granulated under addition of a PVA-solution (10 percent). After drying the granulate to 0.2–1% water content it will, in the present example, be compressed to sheets in a drying press which, after sintering at 1300° C. in an electric furnace, exhibit an open porosity of 29%, at a strength of 45 N/mm$^2$ and a mean porosity of 3.5 $\mu$m.

In a third embodiment 80 weight % of a commercially available initial $TiO_2$-powder having a mean grain size of 0.5 $\mu$m will be sintered at 1300° C. and subsequently wet-milled in a drum mill to a screening refuse of <1% at 100 $\mu$m. 20 weight % of $TiO_2$-powder of a mean grain size of 0.15 $\mu$m and a PVA-solution will subsequently be added into the drum-mill, the components will then be mixed and subsequently granulated to a compressed granulate by means of a column sprayer. In this example, also sheets are formed from the granulate achieved in this manner, which will be sintered at 1260° C. After sintering these shaped bodies exhibit an open porosity of 35%, at a strength of 55 N/mm$^2$ and a mean porosity of 5 $\mu$m.

The sintering temperatures given in the above embodiments are to be understood as the temperatures to be maintained at the respective dwelling phase of the ceramic processes. Thereby, the sintering process is comprised of the heating phase, the dwelling phase, and the cooling phase which, in comparatively wide ranges, depend on the prevailing technical conditions of the respective tempering furnaces. Hence, the following temperature/time characteristics are reasonable ones with respect to the present manufacturing methods:

1. For the pre-sintering of the first part of the $TiO_2$-powder:

1.1 from 20° C. to 1350° C. for 5 through 12 h, 7 hours in the example, 1.2 1350° C. during a dwelling phase of 0.5 through 2 h, 1 h in the example, 1.3 from 1350° C. to 20° C. for 7 through 12 h, 9 hours in the example, and 2. For the sintering of the batch with the further $TiO_2$-powder part/s:

2.1 from 20° C. to 450° C. for 3 through 8 h, 5 hours in the example, from 450° C. to 1260° C. for 3 through 7 h, 5 hours in the example, 2.2 1260° C. during a dwelling phase of 1 through 4 h, 2 h in the example, 2.3 from 1260° C. to 20° C. for 6 through 12 h, 7 hours in the example.

What is claimed is:

1. Method for producing a monolithic, porous, ceramic shaped body from $TiO_2$ having a mean pore size of 1–50 $\mu$m and a porosity of >10%, comprising pre-sintering a first $TiO_2$— powder part at temperatures>1200° C., and subsequently reducing the first $TiO_2$ powder in size to a screening refuse of <5% at grain sizes smaller 100 $\mu$m, adding to and mixing with this granulate at least one further part of $TiO_2$-powder, the grain size of said further part being $\leqq$0.5 $\mu$m, whereby the grain size of said further part is considerably smaller than that of said first $TiO_2$-powder part, pressing the resulting mixture into a shaped body and subjecting said shaped body to a further sintering process at temperatures >1100° C. but below the first sintering temperature.

2. Method as claimed in claim 1, wherein the grain size of the first $TiO_2$-powder part is 0.3 $\mu$m–5 $\mu$m before the pre-sintering.

3. Method as claimed in claim 1, wherein grain size ranges of the first powder part of about 100 $\mu$m after the pre-sintering are selected for the subsequent step of the method.

4. Method as claimed in claim 1 or 2, wherein the grain size of the further $TiO_2$-powder part is 0.1–0.5 $\mu$m.

* * * * *